UNITED STATES PATENT OFFICE.

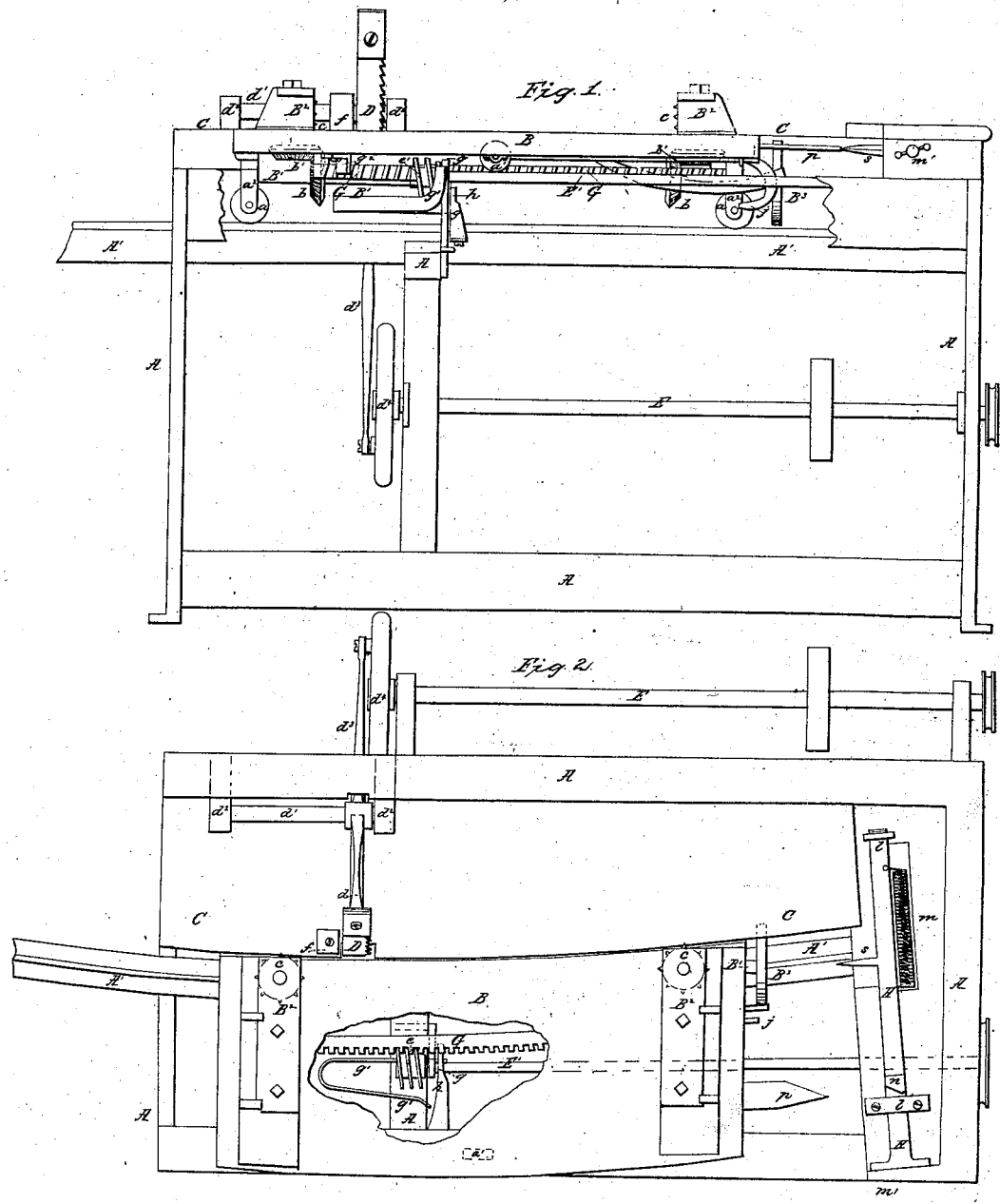

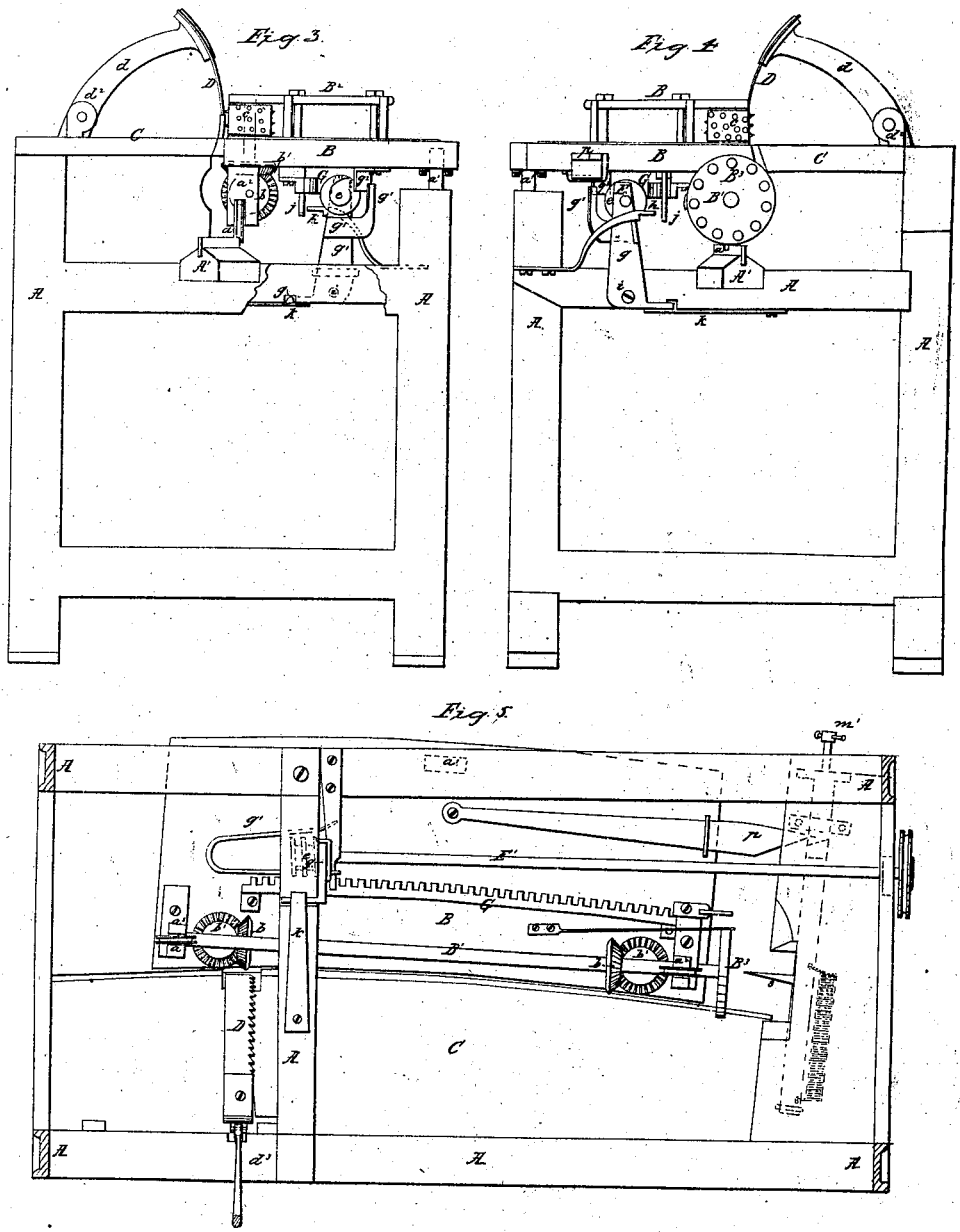

C. G. DIBBLE, OF FARMINGTON, IOWA.

IMPROVEMENT IN STAVE-MACHINES.

Specification forming part of Letters Patent No. 46,548, dated February 28, 1865.

*To all whom it may concern:*

Be it known that I, C. G. DIBBLE, of Farmington, county of Van Buren, State of Iowa, have invented a new and Improved Machine for Making Staves for Barrels, &c.; and I do hereby declare that the following is a full, clear, and exact description thereof, reference being had to the accompanying drawings, making a part of this specification, in which—

Figure 1 is a side elevation of the improved machine with the front rail of the frame broken away. Fig. 2 is a top view with a portion of the carriage broken away to show the gearing beneath it. Fig. 3 is an elevation of one end of the machine. Fig. 4 is an elevation of the opposite end of the machine. Fig. 5 is a bottom view of the machine as seen by making a horizontal section through the uprights of the frame.

Similar letters of reference indicate corresponding parts in the several figures.

My invention relates to certain improvements on that class of stave-making machinery wherein a curved reciprocating saw is employed for sawing the staves from the blocks in conjunction with a reciprocating carriage upon which said blocks are secured, as will be hereinafter described.

The main object of my invention is to feed the blocks up to the work automatically, so that the staves will all be cut of a uniform thickness throughout without the necessity of stopping the machine to adjust the block for each stave that is cut.

To enable others skilled in the art to make and use my invention, I will describe its construction and operation.

In the accompanying drawings, A represents a rectangular frame, which is adapted for containing and supporting the mechanism for holding the blocks from which the staves are cut, feeding these blocks up to the saw, sawing off the staves, and giving a reciprocating movement to said blocks. Upon the upper transverse rails of the frame A, and extending longitudinally from one end to the other of this frame, is a curved track or rail, A', upon which a reciprocating carriage moves. The curvature of this rail is made to conform to the bilge of the barrels which the staves cut by the machine are intended to make. The carriage B is supported upon the rail A' and one of the longitudinal rails of frame A by means of three wheels, $a\ a\ a'$, two of which, $a\ a$, are grooved to fit the narrow curved rail, but the other is flat on its periphery. The journal-blocks $a^2\ a^2$ of the latter wheels serve as bearings for a longitudinal pinion-shaft, B', which carries bevel-pinions $b\ b$ on it, that engage with pinions $b\ b$ on the vertical shafts of two feed-rollers, $c\ c$, that are arranged near the inner curved edge of carriage B in head-blocks $B^2\ B^2$. The feed rollers are armed on their surfaces with spurs, which take into the blocks placed between them and feed these blocks toward the saw a distance equal to the thickness of the staves to be cut off, as will be hereinafter described.

The inner curved edge of the carriage B is fitted closely to a stationary table, C, and this table is in the same horizontal plane as the carriage B, so that the stave is supported upon the curved edge of said table during the operation of sawing it from the block.

At a suitable distance from the rear end of the table C the saw is arranged for sawing off the staves. This saw is attached at its ends to curved arms $d\ d$, which are secured to a longitudinal shaft, $d'$, that has its end bearings in two blocks, $d^2\ d^2$. The saw D is curved, so as to form the arc of a circle which is concentric to the axis of the rock-shaft $d'$, and thus the lateral curvature is given to the staves produced in my machine. To the lower saw-arm, $d'$, a pitman rod, $d^3$, connects this arm to a balance crank-wheel, $d^4$, which is keyed on the end of the main driving shaft E, and as this shaft rotates a reciprocating motion is given to the saw D. At the back of this saw, and secured to the top of the table C, a wedge-shaped plate, $f$, is arranged, so as to enter the kerf made in the block by the saw in the act of severing a stave from it and slightly open the kerf, so that the saw will work freely. Another object of this wedge is to support the stave after it has been cut off from the block until another stave moves along and pushes the former off the table. This wedge also holds the block in the proper position while being sawed and prevents it from crowding on the saw during this operation. At a point beneath the carriage B, between the saw and forward end of the frame A, I employ a worm-screw, $e$, which is keyed on the end of a driving-shaft, E', that receives its motion from the main shaft E. The end of shaft E' carrying this worm screw is supported by a laterally-vibrating plate, $g$, which is pivoted at $i$ to a transverse rail of frame A, as shown clearly in Fig. 4. The lower end of the bearing-plate $g$ is hooked, and the hook catches under said rail, to prevent this plate from being thrust too far backward. One end of a V-shaped spring, $g'$, is secured to the edge of bearing-plate, $g$, and the other end of this spring is free to move when acted upon by a setting-plate, $g^2$, which is secured to the bottom of the carriage, as shown in Figs. 1, 3, and 4. That end of the spring $g'$ which is secured to the plate $g$ projects a short distance therefrom for the purpose of being caught by a notched spring-latch, $h$, and held in such a position that the worm wheel or screw $e$ will engage with the teeth of a curved rack, G. When it is desired to disengage the worm-wheel from its rack, a hook, $j$, is brought into action and lifts the latch $h$, thus allowing a spring, $k$, to thrust the bearing-plate $g$ back.

The rack G is curved in conformity with the rail A', and this rack is secured to the bottom of the carriage B in such relation to the worm-screw $e$ that when this screw is thrown forward and held in gear with the rack the carriage will be thus moved toward the saw for severing a stave from the block. This carriage may then be moved back again by hand or by means of a weight and cord, or in any other suitable manner.

When the carriage is moved back after a stone has been sawed from the block, I desire to move this block forward the thickness of another stave by an automatic contrivance, which I will now describe.

H represents a horizontal sliding plate, which is held down in place by the straps $l\,l$, Fig. 2, and acted upon by a spring, $m$, to keep one end up against a set screw, $m'$. This spring-plate H has a beveled elevation, $n$, on it for the purpose of allowing the projection $p$ on the end of carriage B, to thrust the plate H backward when this carriage returns to commence its operating-stroke. The object of thus moving the plate H is to cause a spur, $s$, projecting from it, to enter one of the perforations in a wheel, B³, which is keyed to the shaft B', and turns this shaft a sufficient distance to move the stave-block a distance equal to the thickness of a stave. The perforations in the wheel B³ are arranged concentrically to its axis and at regular distances apart. If it is desired to diminish the thickness of the staves, the perforations must be made nearer together and the plate H adjusted by the set-screw $m'$, so that the movement of this plate will be diminished in a proper ratio with respect to the position of the perforations in the wheel B³.

Having now described the several parts of my improved machine, I will now briefly describe the operation of the same.

A block of a suitable length and thickness is placed upon the carriage B and pushed up between the spurred feed-rollers $c\,c$, so that these rollers will afterward carry the block to the saw. The saw is now set in motion and motion communicated to the shaft E', and the carriage brought back to a position for starting, in which position the plate $g^2$ will act upon the spring $g'$ and engage the worm-wheel $e$ with the rack G. The carriage is now moved forward and a stave sawed from the block, after which the carriage is moved back again either by hand or otherwise. As the carriage reaches the terminus of its forward stroke the hook $j$ lifts the spring-catch $h$ and allows the spring $k$ to thurst plate $g$ back, and thus disengage the worm-wheel from the rack G. On returning the carriage to commence another stroke forward, the pointed end of the projection $p$ forces the slide $h$ back, and causes the spur $s$ to move the block a distance equal to the thickness of a stave. The carriage then starts forward, and another stave is sawed from the block.

The spurs or teeth on the feed-rollers $c\,c$ should be made with their upper surfaces parallel to the surface of the carriage B, and the bevel necessary to point these teeth should be made on their sides and bottom. This will prevent the blocks from being lifted up or forced downward, so as to drag upon the carriage.

It will be seen from the above description that I am enabled to saw straight staves as well as those which are curved lengthwise by modifying those parts of the machine which adapt it for cutting curved staves, such as the curved rail, curved carriage, and curved rack. By making these parts straight and giving a rectilinear motion to the carriage the operation of those parts which constitute my invention, will be substantially as I have above described.

Having thus described my invention, what I claim as new, and desire to secure by Letters Patent, is—

1. Giving an intermittent feed motion to rollers $c\,c$ for feeding the block up to the work by means of a spur, $s$, actuating a gage-wheel, B³, on the pinion-shaft B', substantially as described.

2. The combination of a pointed projection, $p$, on carriage B with the spurred slide H, substantially as described.

3. The adjusting set-screw $m'$, or its equivalent, in combination with the spurred slide H, substantially as described.

4. The combination of the spurred feed-rollers $c\,c$, applied to head-block B² B² on carriage B, with the bevel-wheels $b'\,b'\,b\,b$, shaft B', and gage-wheel B³, operating substantially as described.

C. G. DIBBLE.

Witnesses:
GEORGE SCHRAMM,
S. C. SCHRAMM.